Oct. 9, 1934.   H. B. OAKLEAF   1,976,410
LUMBER DRYING APPARATUS FOR YARD USE
Filed June 8, 1931   5 Sheets-Sheet 1

INVENTOR.
Howard B. Oakleaf,
BY
Stephen N Campbell
ATTORNEYS

INVENTOR.
Howard B. Oakleaf,
BY
ATTORNEYS

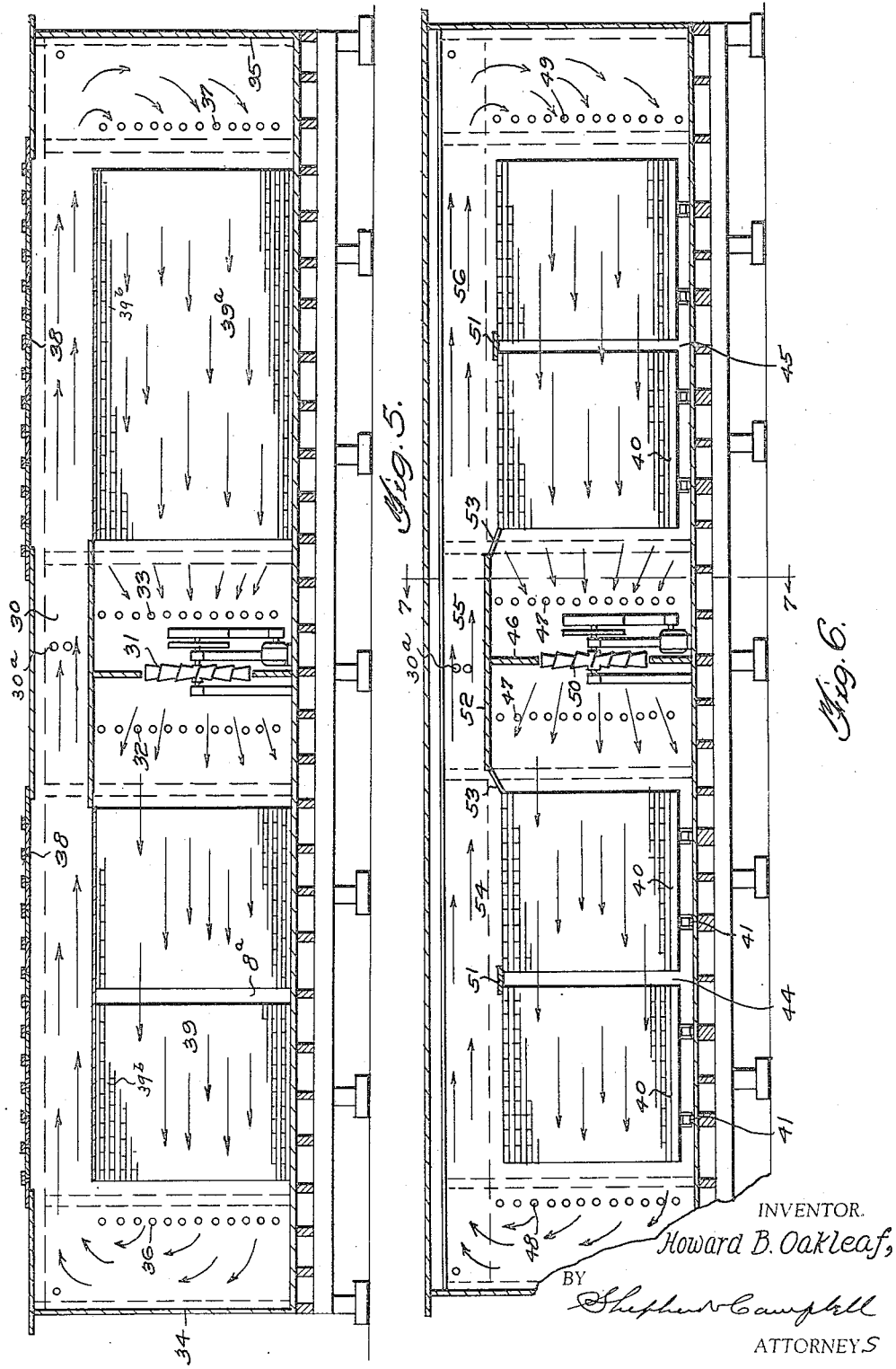

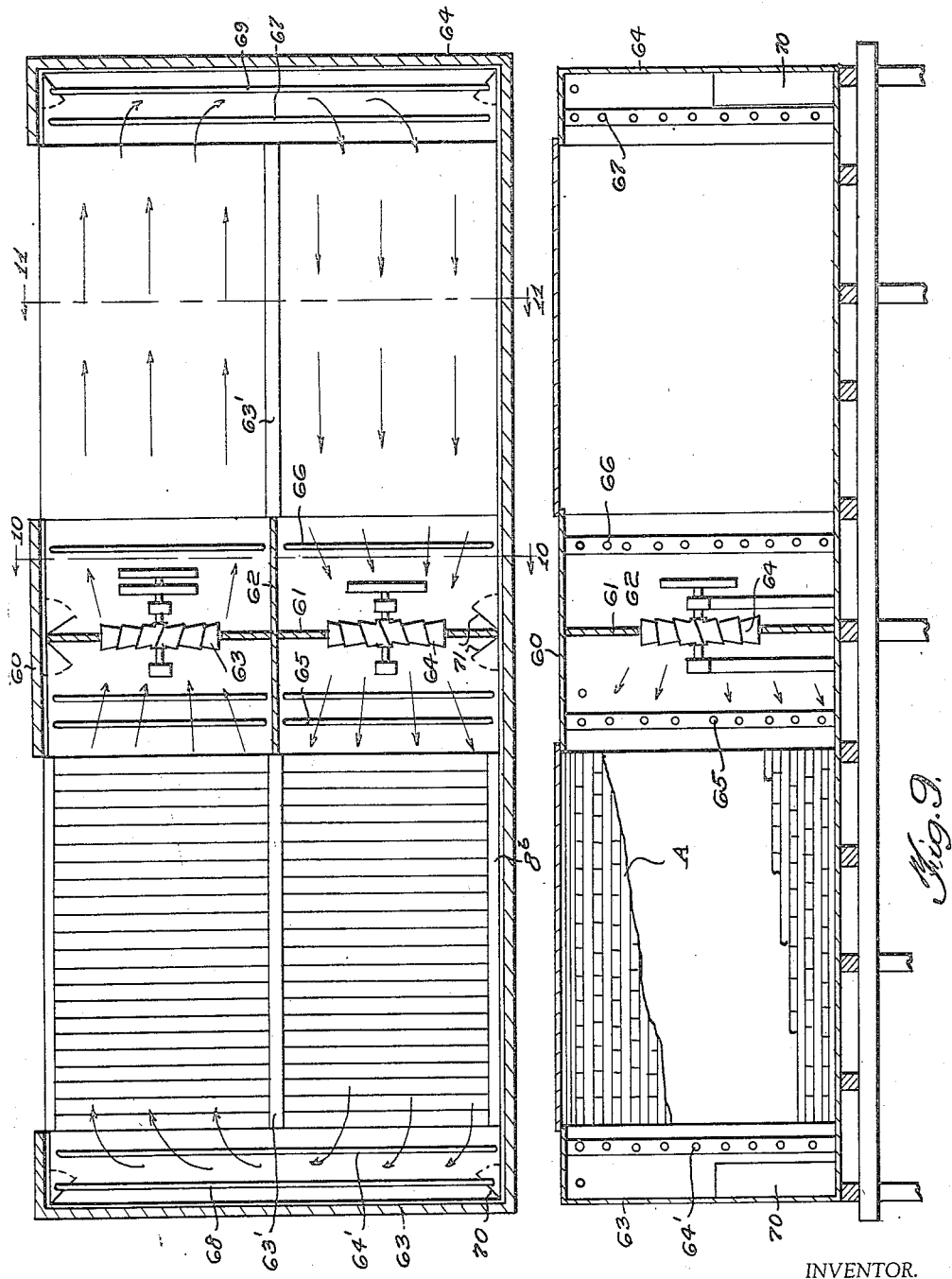

Patented Oct. 9, 1934

1,976,410

UNITED STATES PATENT OFFICE 1,976,410

LUMBER DRYING APPARATUS FOR YARD USE

Howard B. Oakleaf, Portland, Oreg.

Application June 8, 1931, Serial No. 542,975

5 Claims. (Cl. 34—19)

This invention relates to a lumber drying apparatus for yard use, and it has for its object to provide relatively light frame structures of such a nature that lumber may be easily and quickly placed therein in large volume and removed therefrom with facility and dispatch and wherein the lumber may be subjected to suitable conditioning and drying influences, as hereinafter described.

A wide variety of methods are used in drying lumber, ranging from piling the lumber in ventilated piles in the open air and allowing the natural atmosphere to dry the lumber, up to the use of various kinds of highly developed drying chambers (commonly called "dry kilns") in which the lumber is piled in well built (usually masonry) buildings and an artificially controlled atmosphere produced by fans, steam coils, steam sprays, water sprays and other devices, is applied to the stock. After the lumber is dried it is removed from the kilns to storage sheds and stored awaiting its sale, while in the open air yard drying it is left where it has stood while drying, until sold.

When lumber is piled in the open air and its seasoning made subject to the natural atmosphere, the drying progresses very slowly, due to the fact that unless the wind is blowing, moisture in the wood, which has risen to the surface, is not removed and soon saturates the adjoining sluggish atmosphere. Staining, souring and other chemical and bacteriological processes result from this sluggish water removal, thus reducing the value of the lumber. At other times, when hot strong winds blow through the exposed lumber piles, the wood dries too fast and under bad shrinkage conditions, value of the lumber is again reduced. Under an average climatic condition, the weather and winds are ideal for the seasoning of the lumber, perhaps fifty percent of the time.

Dry kilns are used to overcome the disadvantages of open air seasoning by eliminating the approximate fifty percent of the time when bad drying conditions exist. However, the expense of complicated highly developed dry kilns makes it necessary that they be used continuously, with the result that no benefit is derived from those periods when the natural atmosphere is such as to provide desirable drying conditions.

Another phase of the use of the expensive, highly developed dry kilns is that the existing types of kilns are designed for the seasoning of the higher grades of lumber, these grades producing a higher margin of profit and consequently making the use of expensive drying methods economically practicable. The lower grades, however, must also be seasoned and because of their lower value and profit, should have special equipment of a less expensive nature designed for their seasoning.

In the accompanying drawings, forming a part of this application,

Fig. 5 is a longitudinal sectional view of a modified form of the invention.

Fig. 6 is a longitudinal sectional view of a further modification.

Fig. 8 is a view partly in plan and partly in section of a further modification.

Fig. 9 is a view partly in rear elevation and partly in longitudinal section of the structure of Fig. 8.

Like numerals designate corresponding parts in all of the figures of the drawings.

Figure 1:
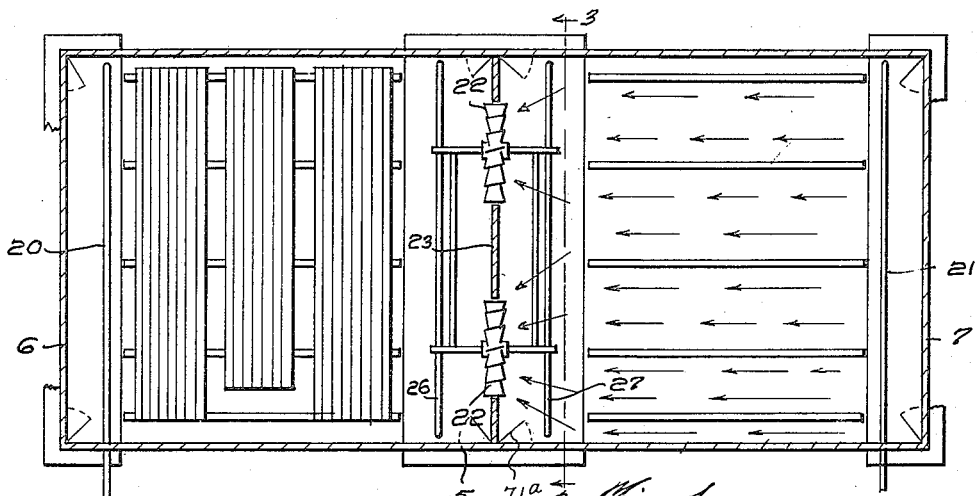
Fig. 1 is a view partly in plan and partly in horizontal section of an apparatus constructed in accordance with the invention.
Figure 2:
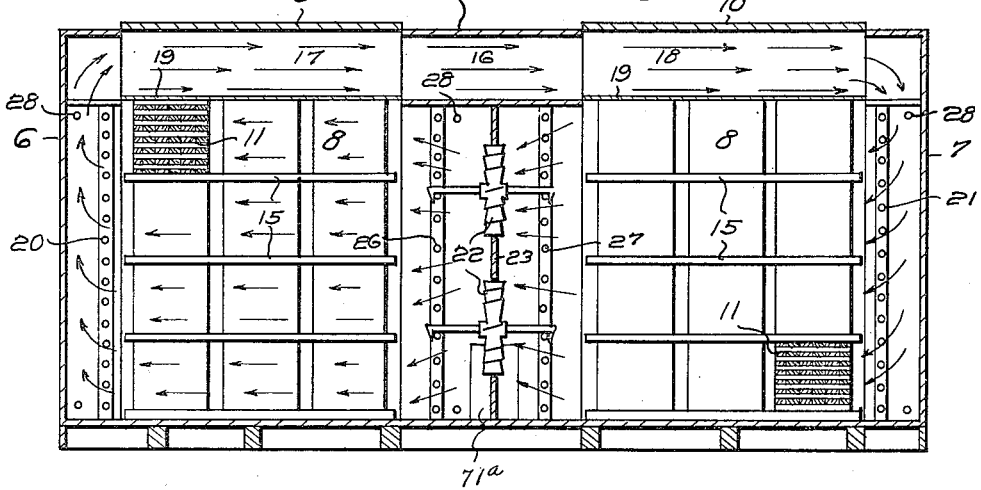
Fig. 2 is a longitudinal sectional view through the structure of Fig. 1.

Referring to the drawings, and particularly to Figs. 1 and 2, it will be seen that the structure constituting the present invention comprises a fixed central air unit housing 5 and fixed end sections 6 and 7. The end sections are separated from the housing 5 by relatively large lumber receiving chambers 8 having removable roof sections 9 and 10 adapted to be lifted bodily from protecting position over chambers 8 so that piles of lumber 11, flat piled in spaced courses, may be lowered into the chambers 8 by means of a crane or derrick.

Figure 4:
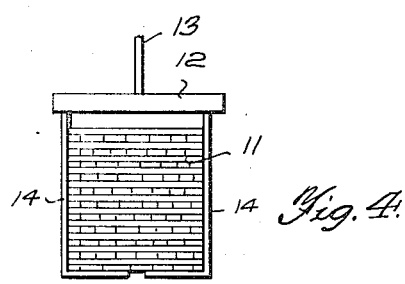
Fig. 4 is a detail view of a lumber handling carrier, hereinafter described.

In Fig. 4 I have illustrated a carrier which may be employed in the manipulation of the loads of lumber, said carrier comprising a crossbar 12 to which the cable 13 of the derrick is connected, and hangers 14 adapted to support the load of lumber. As the several tiers of lumber are loaded into the chambers 8 they are separated from each other by spacing timbers 15.

It will be noted that a transverse passageway is formed across the top of the central air unit and lies in position to aline with the portions 17 and 18 of the chambers 8 which lie above the tops of the piles of lumber so that air may travel in the direction of the arrows. If desired, platens 19 may be disposed above the tops of the piles of lumber to completely separate the space below the said platens from the space above, so that distinct air channels will be provided. Banks of steam pipes 20 and 21 are located in the end housings 6 and 7 and serve to heat the air passing thereby.

Air circulating fans 22 are disposed in a central partition 23 located in the central air unit 5 and these fans are adapted to be driven through suitable connections 24 from a motor or other suitable source of power indicated at 25. Banks of heating pipes 26 and 27 are disposed upon opposite sides of the fans and it is intended, in the operation of the device, to periodically reverse the fans to thereby reverse the direction of air flow. Conventional air conditioning elements such as the spray pipes 28 may be located adjacent the banks of steam pipes for the purpose of humidifying the air to any desired extent.

Figure 3:
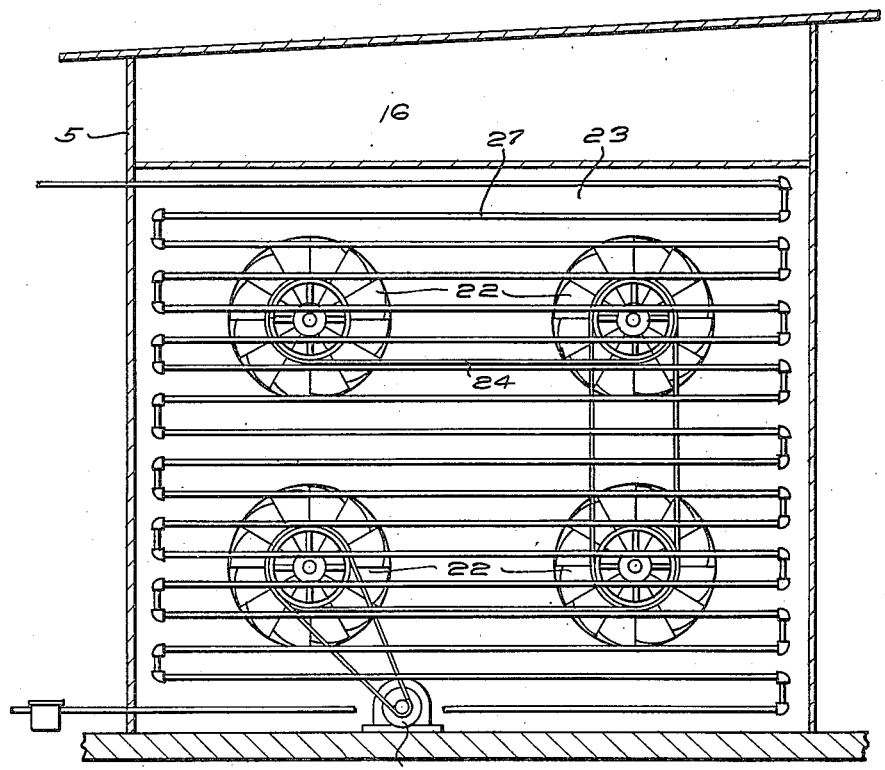
Fig. 3 is a transverse sectional view, on line 3—3 of Fig. 1.
Figure 10:
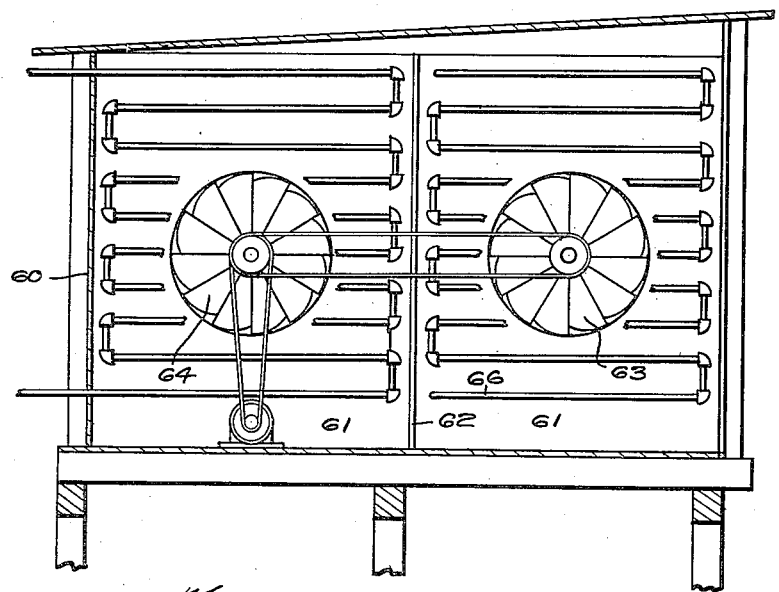
Fig. 10 is a transverse sectional view, on line 10—10 of Fig. 8, with portions of the driving means of the fans omitted.
Figure 11:
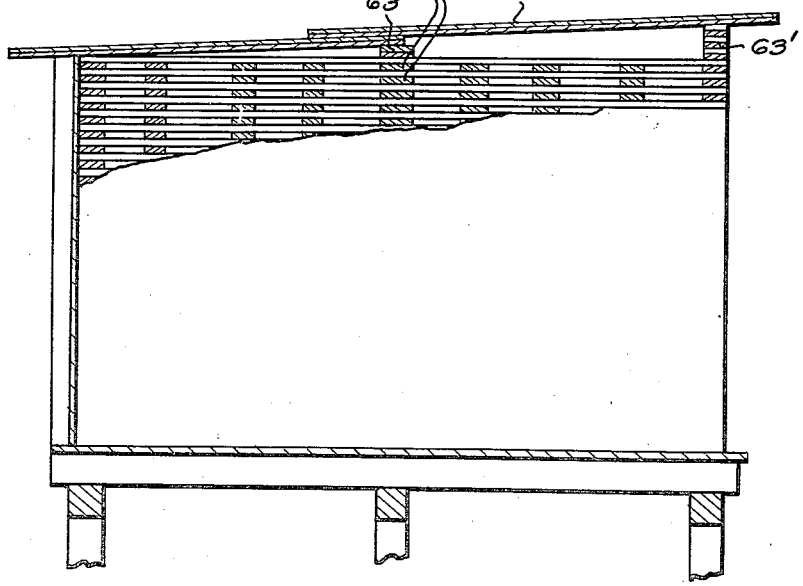
Fig. 11 is a transverse sectional view, on line 11—11 of Fig. 8.

It will be understood that the direction of air flow is as indicated by the arrows, namely, through the piles of lumber in one direction and back through the passageways 17, 16 and 18, in the opposite direction the air being heated and humidified to any desired extent by the elements described. When the direction of rotation of the fans is reversed, the flow of the air will of course be in the opposite direction through passageways 18, 16 and 17 and in the opposite direction through the piles of lumber. While I have shown a common driving motor for all of the fans, in Fig. 3, it is to be understood that the well recognized practice of providing individual motors for the several fans may be resorted to.

In the form of the invention, illustrated in Fig. 5, the arrangement is much the same as that illustrated in Fig. 1. In this case the air circulation is through the transverse passageway 30 of the central air unit.

An air circulating fan is indicated at 31, banks of steam pipes at 32 and 33, fixed end housings at 34 and 35, banks of steam pipes in the end housings at 36 and 37 and removable roof sections at 38. The lumber may be disposed in two or more piles, as indicated at 29, or in a larger pile, as indicated at 39a. The direction of the chambers formed by the presence of the stickers 39b being in the direction of the arrows in both cases.

Figure 7:
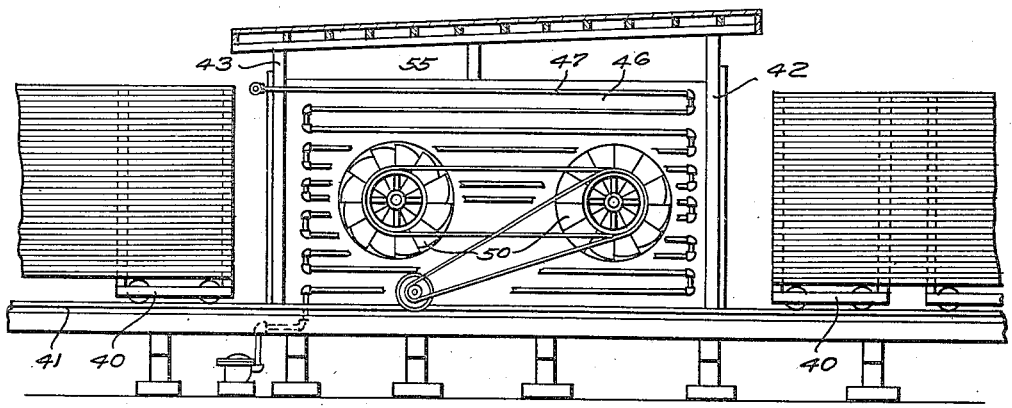
Fig. 7 is a transverse sectional view of the structure of Fig. 6 on line 7—7.

In the form of the invention, illustrated in Figs. 6 and 7, the roof is not removable but the lumber is passed into drying position upon trucks 40 which travel upon rails 41 and which enter from one side of the building and leave from the other side, the building being provided with doorways 42 and 43, providing entrances to the chambers 44 and 45, which correspond to the chambers 8 in Fig. 1.

The central air unit is provided with a vertical and central partition 46 and banks of steam pipes 47 are disposed upon opposite sides of this partition. Banks of steam pipes 48 and 49 are disposed in the end housings. Air circulating fans 50 are disposed in the partition 46 and force air as indicated by the arrows. While I have shown the steam pipes 36, 37, 48 and 49 as being disposed in the end chambers it is to be understood that it is within the scope of the invention to dispose these steam pipes or their equivalents in the length of the overheating passages 30 or 55 and I have indicated two steam pipes 30a in these passages to indicate that this change may be made if desired.

The spaces between the piles of lumber may be closed by boards or platens 51 and the spaces between the piles of lumber, closest to the air unit housing and the horizontal partition 52 of said housing may be closed by baffles 53. This will insure a continuous passageway for the air through chambers 54, 55 and 56.

In the form of the invention illustrated in Figs. 8 to 11, the arrangement is quite different in that the air is carried through one half of the piles of lumber, in one direction, then back through the other half of the piles of lumber in the opposite direction. In this case the central air unit housing is indicated at 60. This housing is divided transversely of the whole structure by a central partition 61 and by a partition 62 which lies at right angles to the partition 61. A right hand fan, or fans, 63 is disposed in partition 61, upon one side of partition 62 and a left hand fan 64 is disposed in the partition 61 upon the opposite side of said partition 62. End housings 63 and 64 are disposed in spaced relation to the air unit housing 60. The rear side of the structure is closed by a wall 61, while the front sides of the chambers 8b, which receive the piles of lumber A, are open. The tops of these chambers are likewise left open for the ready entry and stacking of lumber therein. After the lumber has been stacked in chambers 8b, removable roof sections may be placed in position thereover if desired. These roof sections may be made up roof sections or they may consist merely of loose boards 62' laid over the piles of lumber and supported thereon in any desired way, as by the use of some of the stickers 63', such as are employed in spacing the courses of the lumber to provide air passages therethrough. By referring to Figs. 8 and 11 it will be seen that the stickers of the central row are disposed in vertical alinement with each other as indicated at 63a and this results in separating the air spaces of the lumber from each other between the opposite sides of the central row of stickers, with the result that when the fans 63 and 64 are set in operation they will (because they act in opposite directions due to the fact that one is a right hand fan and the other is a left hand fan) cause a circulation of air in the direction indicated by the arrows, viz. longitudinally in one direction along one half of the whole structure and then longitudinally in the opposite direction along the other half of the structure. This will result, as before stated, in causing air to travel transversely through one half of the individual lumber piles and then in the opposite direction through the other half of said piles of lumber, the air being caused to travel serially through the halves of a plurality of piles, the air being suitably conditioned during its passage through the end housings and the central air unit in the manner hereinbefore described, viz. by being subject to the contact with heating pipes 64', 65, 66 or 67 or the action of spray pipes 68 or 69. Doors 70 in the end housings and 71 in the central air unit housing provide means for the entry of fresh air and the modification of the drying currents of air, at will. Like doors 71a may be provided in Fig. 1.

In fine weather the lumber may be left uncovered in the chambers 8b and the open fronts of these chambers permit the entry of warm atmospheric air, winds and sunshine, so that favorable atmospheric conditions may be utilized advantageously and to the full with a consequent economy in the drying of the cheaper grades of lumber. The same is true with respect to Figs. 2 and 5. That is to say in these figures the removable roof sections may be left off in fine weather and the fans stopped, especially where time is not of importance. This is sometimes the case where large stocks of lumber have been accumulated and the market is poor. While I have indicated heating pipes in the several figures of the drawings I wish to make it clear that I recognize the possibility of utilizing electric heating units for heating the air.

It is to be understood that the invention is not limited to the particular arrangement shown but that it includes within its purview whatever changes fairly come within either the terms or the spirit of the claims allowed herein.

Having described my invention, what I claim is:

1. Apparatus of the character described comprising a substantially centrally disposed fixed section, a pair of fixed end sections spaced from the first named section and lumber receiving chambers between and separating the centrally arranged sections from the end sections, said chambers receiving lumber flat piled in spaced courses and each pile divided longitudinally of the kiln by interposed stickers into substantially separate halves, oppositely acting air moving means in the central section arranged in alignment with the opposite halves of the piles of lumber, respectively, and acting to draw air through one-half of the member of each of said piles while forcing air through the other half of the member of said piles.

2. A structure as recited in claim 1 wherein the lumber receiving chambers are provided with at least one removable side for the loading of lumber laterally thereinto.

3. A device of the character described comprising a relatively long and narrow kiln structure divided into a substantially centrally disposed fixed section, fixed end sections, and lumber receiving chambers between the central sections and fixed end sections adapted to receive lumber flat piled in spaced courses, said lumber receiving sections being provided with at least one open side to permit of the feeding of lumber laterally thereinto, air moving means in the central section arranged to draw air from one end section through one of said lumber piles while pushing said air through the other of said piles into the other of said end sections, and a return path for said air, the piles of lumber in each of said sections being divided longitudinally into completely separated halves by stickers which force the air to travel straight through one-half of a pile in one direction and straight back through the other half of said pile in the other direction.

4. A structure as recited in claim 3 in combination with heating means in the fixed end sections.

5. A structure as recited in claim 3 in combination with a centrally arranged longitudinal extending partition in the central section which aligns with the line of division between the opposite sides of the lumber piles.

HOWARD B. OAKLEAF.